United States Patent [19]
Imai

[11] Patent Number: 5,825,541
[45] Date of Patent: Oct. 20, 1998

[54] STEREOSCOPIC DISPLAY SYSTEM

[75] Inventor: Masao Imai, Tokyo, Japan

[73] Assignee: NEC Corporation, Tokyo, Japan

[21] Appl. No.: 686,758

[22] Filed: Jul. 26, 1996

[30] Foreign Application Priority Data

Jul. 27, 1995 [JP] Japan .................................. 7-210190

[51] Int. Cl.$^6$ .......................... G02B 27/22; G02B 27/26; H04N 9/47; H04N 13/04
[52] U.S. Cl. .......................... 359/464; 359/465; 359/462; 359/466; 348/55; 348/56; 348/57
[58] Field of Search .................................. 359/462, 464, 359/465, 466, 487; 348/55, 56, 57, 58; 349/15

[56] References Cited

U.S. PATENT DOCUMENTS

| 2,883,906 | 4/1959 | Rehorn | 359/465 |
| 5,096,520 | 3/1992 | Faris | 359/487 |
| 5,264,964 | 11/1993 | Faris | 359/465 |
| 5,313,377 | 5/1994 | Isono et al. | 348/51 |
| 5,717,522 | 2/1998 | Hattori et al. | 359/465 |

FOREIGN PATENT DOCUMENTS

4-250439   9/1992   Japan .

Primary Examiner—Thong Nguyen
Assistant Examiner—Audrey Chang
Attorney, Agent, or Firm—Foley & Lardner

[57] ABSTRACT

In synchronism with a vertical synchronizing signal of a display for temporarily alternatively displaying a right eye picture and a left eye picture cooperative with each other to provide binocular parallax information, a shifter is controlled to shift a first parallax barrier by half a pitch of stripe regions thereof to effect a switching between a state in which every other stripe region is transparent and the remaining stripe regions are all shading and a reversed state thereof so that the right eye picture and the left eye picture are independently observable by a right eye and a left eye of an observer, respectively, through the first parallax barrier and a second parallax barrier composed of a plurality of stripe regions of which every other one is transparent while the remaining ones are all shading.

6 Claims, 7 Drawing Sheets

LEFT EYE PICTURE

FIG. 2A PRIOR ART

RIGHT EYE PICTURE

F I G. 4B

LEFT EYE PICTURE

F I G. 4A

RIGHT EYE PICTURE

RIGHT EYE PICTURE

FIG. 7B

LEFT EYE PICTURE

STEREOSCOPIC DISPLAY SYSTEM

BACKGROUND OF THE INVENTION

The present invention generally relates to a stereoscopic display system, and particularly, to a stereoscopic display system of the type which permits a stereoscopic vision to be observed without a pair of glasses dedicated therefor.

DESCRIPTION OF THE RELATED ART

There have been known stereoscopic display systems of such the type, e.g. one in which a plurality of profiles of an object is sequentially displayed in synchronism with a movement of a mobile screen, one that employs a hologram, and one in which a pair of pictures having binocular parallax information are independently presented either to a right eye and the other to a left eye.

However, in the systems using a mobile screen or hologram, the quantity of information to be processed is too large to permit a practical application to a motion picture.

Accordingly, current developments in the art are directed mainly to stereoscopic display systems of the type that employs binocular parallax information to provide a stereoscopic vision.

This type of stereoscopic display system can be constituted by using a conventional display such as a CRT (cathode ray tube) or an LCD (liquid crystal display), and permits a stereoscopic vision to be achieved with ease.

Stereoscopic display systems using binocular parallax information are inherently classified into a first group in which a stereoscopic vision is observed through a pair of particular spectacles, such as a pair of polarizing spectacles or LC shutter spectacles, that an observer is required to put, and a second group in which a stereoscopic vision is observed through a particular optical member, such as a lenticular lenz or parallax barrier, that is arranged over or in front of a display. In the second group, an observer is permitted to see a stereoscopic vision without the need of particular spectacles.

Figure 1:
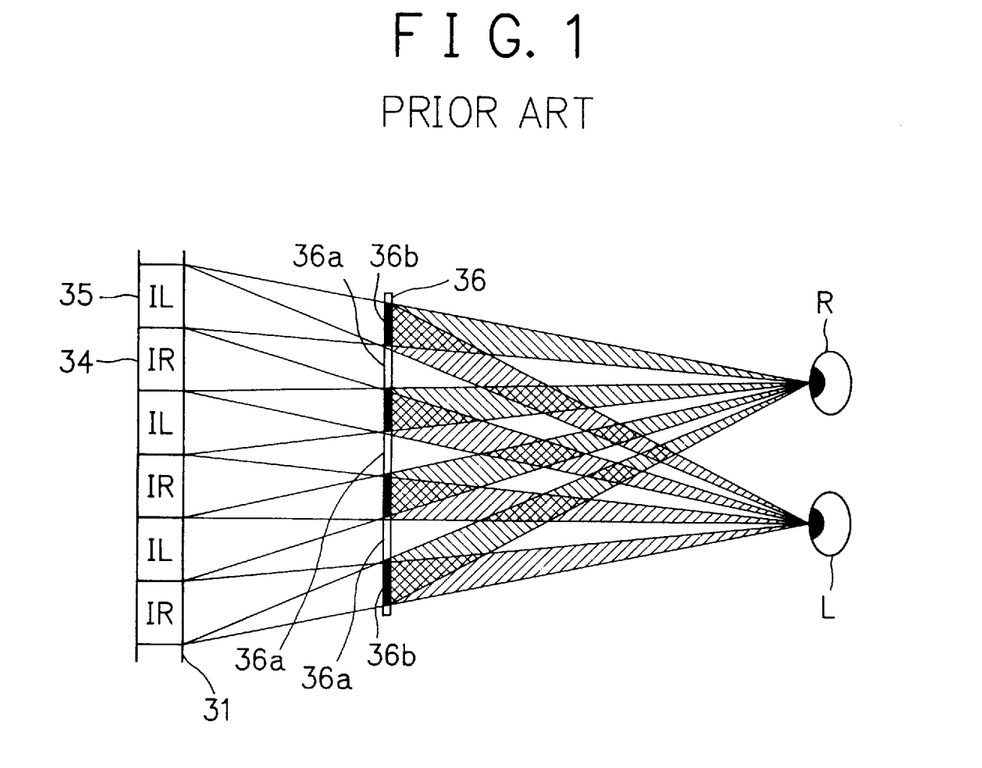
FIG. 1 is a sectional plan of a conventional stereoscopic display system.

FIG. 1 shows a sectional plan of a conventional stereoscopic display system using a parallax barrier.

As shown in FIG. 1, the conventional stereoscopic display system comprises a display 31, and a parallax barrier 36 composed of a plurality of stripe-shaped light-transmitting regions 36a (hereafter sometimes "transparent regions") and a plurality of stripe-shaped light-shutting regions 36b (hereafter sometimes "shading regions").

In the conventional system of FIG. 1, a right eye picture and a left eye picture cooperative with each other to provide binocular parallax information are divided into a number of stripe-shaped right eye images IR and a number of stripe-shaped left eye images IL in accordance with a total number of the transparent regions 36a and a total number of the shading regions 36b of the parallax barrier 36, respectively. The right eye images IR and the left eye images IL are all elongate in a vertical direction of a display region of the display 31.

The display 31 is controlled to display the display region a combination of a re-arranged right eye image array 34 consisting of a reduced number of right eye images IR, as they are sampled, and a re-arranged left eye image array 35 consisting of a reduced number of left eye images IL, as they are sampled, while the right eye images IR and the left eye images IL are alternatively arrayed in a horizontal direction.

In the parallax barrier 36, the stripe regions 36a and 36b are alternatively arrayed in the horizontal direction at a geometrically determined pitch so that the right eye image array 34 is observable merely by a right eye R of an observer resting on a seat provided in place and the left eye image array 35 is observable merely by a left eye L of the observer.

As the right eye R and the left eye L independently observe the right eye image array 34 and the left eye image array 35, respectively, the right eye images IR and the left eye images IL in the observed image arrays 34 and 35 are visually fused into a single stereoscopic vision at the brain of the observer.

The conventional system of FIG. 1 permits the observer to observe the stereoscopic vision without putting particular spectacles.

However, this conventional system is subjected to a drawback that the observed vision has a solution reduced to a half, in addition to that the parallax barrier 36 needs a precise positioning relative to a displayed picture.

For example, in a case of a currently typical television of a 20-inch size with a horizontal resolution of 400 lines, there is needed an alignment to a criterion near 0.1 mm.

Such a precise alignment has to be secured along a vertical length of the displayed picture, thus needing a high precision in particular for a positioning in a rotational or tangential direction.

Accordingly, even if a positioning of the parallax barrier 36 is complete at an ex-factory delivery, it should be difficult for the user to re-attach the barrier 36 to the display 31.

It would be desirable if the parallax barrier 36 could be detached from the display 31 to permit a two-dimensional picture to be directly observed without an interposition of the barrier 36 causing a picture resolution to be reduced.

However, such a detachment of the parallax barrier 36 is impractical.

To this point, there has been proposed in Japanese Patent Application Laid-Open Publication No. 4-250439 a stereoscopic display system including a pair of electronic optical shutters adapted to be cooperative with each other to work as a parallax barrier member and provided on a display region of a display, permitting the shutters as the barrier member to be detached from the display in a facilitated manner.

Figure 2A:
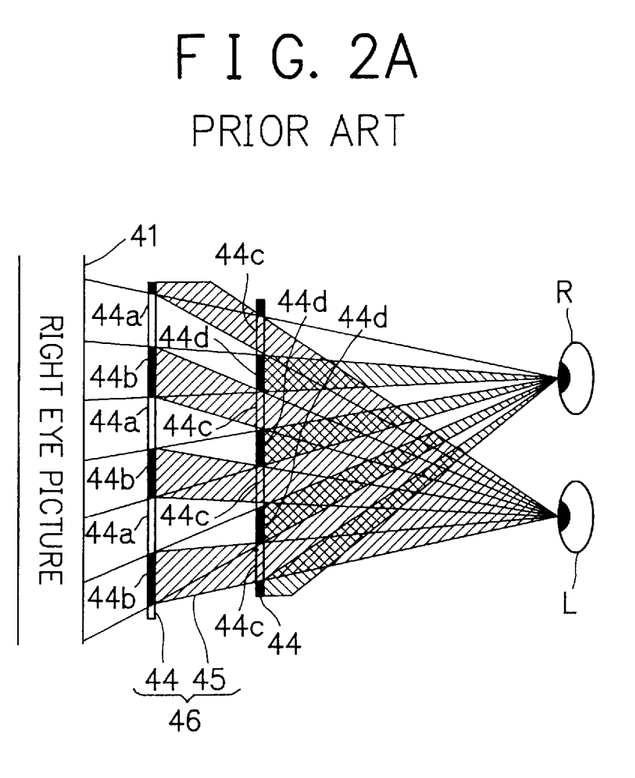
FIGS. 2A and 2B are sectional plans at controlled timings to see right eye and left eye pictures of another conventional stereoscopic display system, respectively.
Figure 2B:
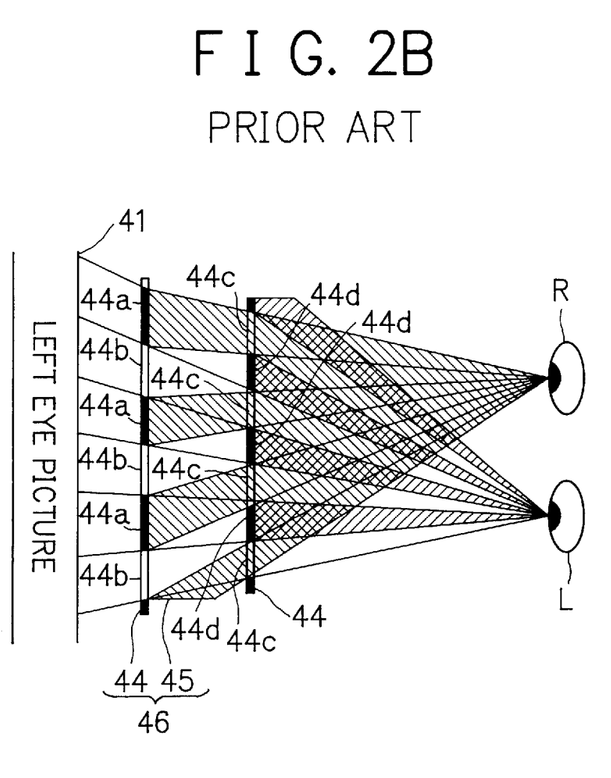

FIGS. 2A and 2B show sectional plans at controlled timings to see right eye and left eye pictures of the conventional stereoscopic display system proposed in the Publication No. 4-250439, respectively.

This conventional system comprises a display 41 for temporarily alternatively displaying a right eye picture and a left eye picture, and a stereoscopic display screen 46 composed of the pair of electronic optical shutters designated at reference character 44 and a screen plate 45 interposed between the optical shutters 44.

The optical shutters 44 are each composed of a plurality of horizontally divided vertically elongate regions (hereafter "lines") like a reed screen, the lines being transparent at every other corresponding spatial region 44a or 44c and shading at each of the remaining spatial regions 44b or 44d.

In a state of FIG. 2A with the right eye picture displayed on the display 41, the optical shutters 44 are transparent at the spatial regions 44a and 44c and shading at the spatial regions 44b and 44d so that the right eye picture on the display 41 is observable by a right eye R of an observer, but not by a left eye L of the observer, as associated dimensions are geometrically so determined, such as a of distance between the optical shutters 44 and pitches of the transparent regions 44a and 44c.

On the other hand, in a state of FIG. 2B with the left eye picture displayed on the display 41, a left one of the optical shutters 44 is controlled, with their positions left as they are, to be transparent at the spatial regions 44b and shading at the spatial regions 44a, i.e. the respective transparent regions 44a in FIG. 2A are reversed to be shading and the respective shading regions 44b in FIG. 2A are reversed to be transparent, so that the left eye picture on the display 41 is observable by the left eye L of the observer, but not by the right eye R.

As the right eye picture and the left eye picture are cooperative with each other to constitute a pair of complementary parallax images for both eyes, the observer whose right eye R and left eye L independently observe the right eye and left eye pictures, respectively, is permitted to see them forming a stereoscopic vision.

This conventional system does not need a precise positioning of the stereoscopic display screen 46 relative to the display 41, while a high precision is necessary for an alignment between the optical shutters 44.

Therefore, the display screen 46 composed of the shutters 44 and the screen plate 45 might have been constituted as a unit so that upon change-over between a stereoscopic vision and a two-dimensional picture the unit might have been simply attached to or detached from the display 41 with ease, concurrently solving the problem of a reduction of a resolution to a half in observation of the two-dimensional picture.

However, this conventional system which employs a pair of electronic optical shutters 44 has another problem that an observable vision is very dark.

This is because of the use of a pair of electronic optical shutters which employ an LC (liquid crystal) or PLZT (PbLa(ZrTi)O$_3$) as a material for each shutter line therein that is controlled to be switched over between a transparent state and a shading state by making use of a polarization effect.

In other words, a single electronic optical shutter needs a pair of polarization plates, of which a first one has an ideal transmittance of about 43% to natural light incident thereto and a second one has an ideal transmittance of about 86% to linear polarized light incident thereto from the first shutter, thus resulting in a total ideal transmittance of about 37%.

As the pair of electronic optical shutters are employed, there are provided a total of four polarization plates for transmitting rays of light to be observed, giving a total ideal transmittance of about 27%, in addition to various losses such as due to actual transmittances of transparent regions and surfacial reflections of respective optical components.

As a result, the stereoscopic display screen 46 is subjected to a total transmittance reduced to a level as low as a 10% or near.

To this point, the display 41 might have an increased brightness to render an observable vision brighter to a certain degree.

However, such a measure might have caused an increased power consumption, or given a still dark vision, as a necessary display brightness exceeded an available control range.

Still less, there is left unsolved the problem of a reduction of a resolution to a half.

The present invention has been achieved with such points in mind.

SUMMARY OF THE INVENTION

It therefore is an object of the present invention to provide a stereoscopic display system in which a stereoscopic vision and a two-dimensional picture can be changed over with ease, permitting the stereoscopic vision to be observed with an improved brightness, making use of a conventional display, without using a pair of glasses dedicated therefor.

It also is an object of the present invention to provide a stereoscopic display system permitting a bright stereoscopic vision to be observed without causing an undesirable reduction of a resolution.

To achieve the object, a genus of the present invention provides a stereoscopic display system comprising a display for temporarily alternatively displaying a right eye picture and a left eye picture cooperative with each other to provide binocular parallax information, a first parallax barrier and a second parallax barrier arranged both in front of the display and disposed either behind the other, the first and second parallax barriers each having a plurality of transparent regions and a plurality of shading regions alternatively formed therein so as to extend like stripes elongate in a parallel direction to a vertical direction of the right eye and left eye pictures, and a shifter for shifting one of the first and second parallax barriers in one of rightward and leftward directions of the right eye and left eye pictures in synchronism with a display switching between the right eye and left eye pictures so that the right eye picture is observable by a right eye of an observer and the left eye picture is observable by a left eye of the observer.

According to a species of the genus of the invention, the display has a plurality of horizontal scan lines sequentially operable from a top one in a display action for sequentially displaying one of the right eye picture and the left eye picture, as it is switched from the other thereof, and said one of the first and second parallax barriers is stepwise shifted sequentially from a top portion thereof in synchronism with the display action.

Moreover, to achieve the object, another genus of the present invention provides a stereoscopic display system comprising a display for temporarily alternatively displaying a right eye picture and a left eye picture cooperative with each other to provide both eye parallax information, a parallax barrier arranged in front of the display, the parallax barrier having a plurality of first transparent regions and a plurality of first shading regions alternatively formed therein so as to extend like stripes elongate in a parallel direction to a vertical direction of the right eye and left eye pictures, and an electronic shutter array arranged in one of a place between the display and the parallax barrier and a place in front of the parallax barrier, the electronic shutter array being composed of a plurality of second transparent regions and a plurality of second shading regions alternatively formed therein so as to extend like stripes elongate in the parallel direction to the vertical direction of the right eye and left eye pictures, the second transparent regions and the second shading regions being reversible into a plurality of third shading regions and a plurality of third transparent regions, respectively, and vice versa, the electronic shutter array being operable for a switching between a first state having the second transparent regions and the second shading regions and a second state having the third shading regions and the third transparent regions in synchronism with a display switching between the right eye and left eye pictures so that the right eye picture is observable by a right eye of an observer and the left eye picture is observable by a left eye of the observer.

According to a species of this genus of the invention, the display has a plurality of horizontal scan lines sequentially operable from a top one in a display action for sequentially displaying one of the right eye picture and the left eye picture, as it is switched from the other thereof, and the switching between the first state and the second state of the electronic shutter array is stepwise effected sequentially from a top portion of the electronic shutter array in synchronism with the display action.

Further, to achieve the object, another genus of the present invention provides a stereoscopic display system comprising a display for temporarily alternatively displaying a right eye picture and a left eye picture cooperative with each other to provide binocular parallax information, a pair of polarizers arranged in front of the display and disposed either behind the other, a first rotary-polarizing multi-slit member and a second rotary-polarizing multi-slit member arranged both between the pair of polarizers and disposed either behind the other, the first and second rotary-polarizing multi-slit members being each composed of a plurality of first regions each having a tendency to rotate a polarization direction of incident light thereto substantially at a 90° direction and a plurality of second regions each having a tendency to hold a polarization direction of incident light thereto, the first and second regions being alternatively formed so as to extend like stripes elongate in a parallel direction to a vertical direction of the right eye and left eye pictures, and a shifter for shifting one of the first and second rotary-polarizing multi-slit members in one of rightward and leftward directions of the right eye and left eye pictures in synchronism with a display switching between the right eye and left eye pictures so that the right eye picture is observable by a right eye of an observer and the left eye picture is observable by a left eye of the observer.

According to a species of this genus of the invention, the display has a plurality of horizontal scan lines sequentially operable from a top one in a display action for sequentially displaying one of the right eye picture and the left eye picture, as it is switched from the other thereof, and said one of the first and second rotary-polarizing multi-slit members is stepwise shifted sequentially from a top portion thereof in synchronism with the display action.

Still more, to achieve the object, another genus of the present invention provides a stereoscopic display system comprising a display for temporarily alternatively displaying a right eye picture and a left eye picture cooperative with each other to provide binocular parallax information, a pair of polarizers arranged in front of the display and disposed either behind the other, a rotary-polarizing multi-slit member arranged between the pair of polarizers and disposed in one of a first place and a second place therebetween either nearer to the display and the other nearer to an observer, the rotary-polarizing multi-slit member being composed of a plurality of first regions each having a tendency to rotate a polarization direction of incident light thereto substantially at a 90° direction and a plurality of second regions each having a tendency to hold a polarization direction of incident light thereto, the first and second regions being alternatively formed so as to extend like stripes elongate in a parallel direction to a vertical direction of the right eye and left eye pictures, and a rotary-polarizing switch array disposed in the other of the first place and the second place between the pair of polarizers, the rotary-polarizing switch array being composed of a plurality of third regions each having a tendency to rotate a polarization direction of incident light thereto substantially at a 90° direction and a plurality of fourth regions each having a tendency to hold a polarization direction of incident light thereto, the third and fourth regions being alternatively formed so as to extend like stripes elongate in the parallel direction to the vertical direction of the right eye and left eye pictures, the third regions and the fourth regions being reversible into a plurality of fifth regions each having a tendency to hold the polarization direction of the incident light thereto and a plurality of sixth regions each having a tendency to rotate the polarization direction of the incident light thereto substantially at a 90° direction, respectively, and vice versa, the rotary-polarizing switch array being operable for a switching between a first state having the third and fourth regions and a second state having the fifth and sixth regions in synchronism with a display switching between the right eye and left eye pictures so that the right eye picture is observable by a right eye of the observer and the left eye picture is observable by a left eye of the observer.

According to a species of this genus of the invention, the display has a plurality of horizontal scan lines sequentially operable from a top one in a display action for sequentially displaying one of the right eye picture and the left eye picture, as it is switched from the other thereof, and the switching between the first state and the second state of the rotary-polarizing switch array is stepwise effected sequentially from a top portion of the rotary-polarizing switch array in synchronism with the display action.

BRIEF DESCRIPTION OF THE DRAWINGS

The objects, features and advantages of the present invention will become more apparent from consideration of the following detailed description, in conjunction with the accompanying drawings, in which.

DESCRIPTION OF THE PREFERRED EMBODIMENTS

There will be detailed below the preferred embodiments of the present invention, with reference to the accompanying drawings. Like members are designated by like reference characters.

Figure 3A:
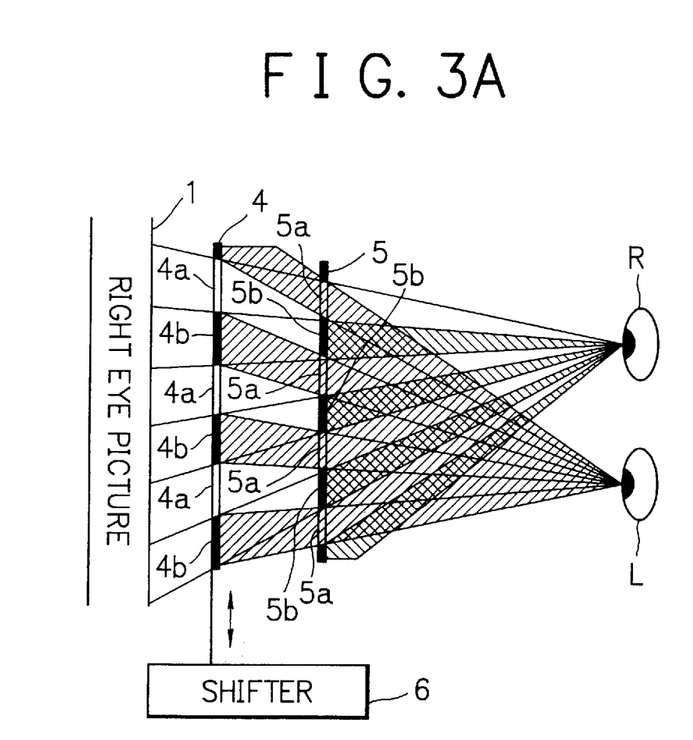
FIGS. 3A and 3B are sectional plans at controlled timings to see right eye and left eye pictures of a stereoscopic display system according to an embodiment of the invention, respectively.
Figure 3B:
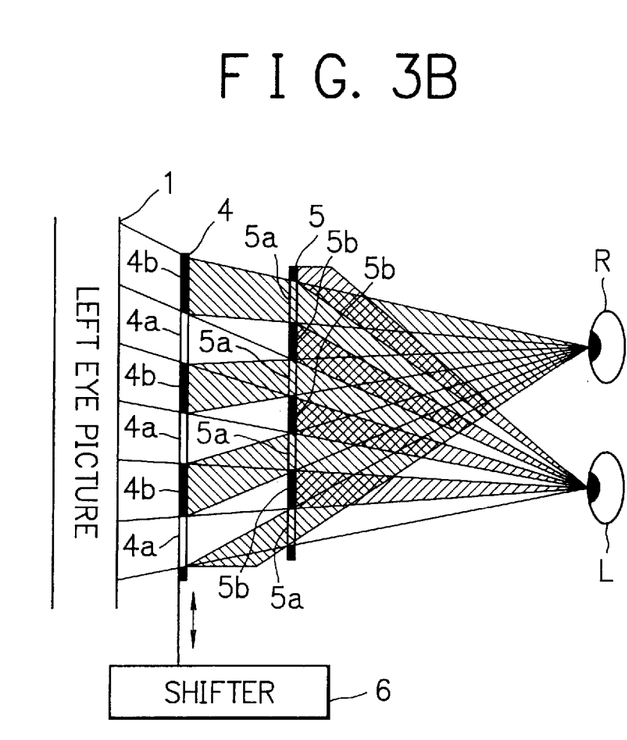

FIGS. 3A and 3B show sectional plans at controlled timings to see right eye and left eye pictures of a stereoscopic display system according to a first embodiment of the invention, respectively.

The stereoscopic display system comprises a display 1, a combination of a first parallax barrier 4 and a second parallax barrier 5 disposed in front of the display 1 in a mutually opposing manner, and a shifter 6 as a shifting mechanism linked with the first parallax barrier 4.

There will be described below principal actions of the stereoscopic display system according to the first embodiment.

The display 1 has a right eye picture and a left eye picture alternatively displayed thereon every field.

As shown in FIG. 3A with the right eye picture displayed on the display 1, the first parallax barrier 4 as well as the second parallax barrier 5 has light transparent regions 4a (or 5a) and (eye) shading regions 4b (or 5b) (from the picture) vertically extending like stripes.

Associated dimensions are geometrically designed. Supposing the display 1 to be a monitor of a max. 2–m size, for example, the first and second parallax barriers 4 and 5 have a predetermined distance therebetween near 5 mm, and their transparent stripes 4a and 5a are formed at predetermined horizontal intervals equivalent to widths of corresponding shading stripes 4b and 5b, so that three seats may be arranged for observers at a distance between 60 cm to 100 cm from the display 1, in parallel with the display 1, providing optimal view points at horizontal intervals of about 12 cm for right eyes R as well as for left eyes L, which means an optimal view point for either eye R or L appears at intervals of about 6 cm. The transparent and shading stripes 4a and 4b or 5a and 5b have an even width in each of the barriers 4 and 5.

As a result, in FIG. 3A, the right eye picture on the display 1 can be seen from the right eye R of each observer through the transparent stripes 4a and 5a, but the left eye L is shaded therefrom by the shading stripes 4b and 5b.

In FIG. 3B with the left eye picture displayed on the display 1, the first parallax barrier 4 is displaced by the shifter 6 in a horizontal direction, at a distance equivalent to half the stripe width, so that spatial regions corresponding to the transparent regions 4a of FIG. 3A become shading and those corresponding to the shading regions 4b of FIG. 3A become transparent, i.e. they are reversed.

As a result, in FIG. 3B, the left eye picture on the display 1 can be seen from the left eye L of each observer through the transparent stripes 4a and 5a, but the right eye R is shaded therefrom by the shading stripes 4b and 5b.

As the right eye picture and the left eye picture are cooperative with each other to constitute a pair of complementary parallax images for both eyes, each observer whose right eye R and left eye L independently observe the right eye and left eye pictures, respectively, is permitted to see them forming a stereoscopic vision.

There will be detailed below the arrangement of the stereoscopic display system described.

The display 1 comprises a conventional CRT (cathode rad tube) using a fluorescent substance relatively short of afterglow.

The first parallax barrier 4 as well as the second parallax barrier 5 comprises a nontransparent metallic film deposited on a glass plate, before an etching of the film to form stripe regions 4a (or 5a) for transmitting light.

For an observer at a distance of 60 cm from the second parallax barrier 5, the stripe regions of the barrier 5 are formed at a pitch of 0.4 mm, while the stripe pitch of the first parallax barrier 4 is set to approx. 0.4012 mm. The first and second parallax barriers 4 and 5 are disposed with a relative distance of approx. 1.8519 mm, and oriented to have their stripes parallel to each other.

The width ratio of transparent region to shading region is set to a unity. It may however be preferable for the first or second parallax barrier 4 or 5 to have transparent regions thereof reduced in width to thereby reduce a crosstalk between right eye and left eye pictures when the observer slightly moves to the right or left from a predetermined position for observation.

The glass plate may have an anti-reflective film consisting of a multiplicity of dielectric coats formed on a surface at each or one of the front and rear sides thereof so that a reduced reflection loss provides a stereoscopic vision with an increased brightness.

The shifter 6, which may be a piezoelectric actuator or the like, is implemented to shift the first parallax barrier 4 by half the stripe pitch. For this purpose, a vertical synchronizing signal is detected from a video signal input to the display 1, so that its timing may be employed to drive the piezoelectric actuator or the like.

For example, the first parallax barrier 4 may be shifted in position as in FIG. 3A at an odd-number field in which the right eye picture is displayed, and as in FIG. 3B at an even-number field in which the left eye picture is displayed.

The stereoscopic display system according to the first embodiment thus permits a stereoscopic vision to be achieved by using the conventional display 1 without the need of a pair of dedicated glasses therefor.

The first and second parallax barriers 4 and 5 and the shifter 6 may be assembled together as a unit so that upon change-over between a stereoscopic vision and a two-dimensional picture the unit may be simply attached to or detached from the display 1 with ease, i.e, without needing a precise positioning.

The first embodiment employs no polarizers. A total transmittance of light depends on a ratio of a total sum of areas of transparent regions to a total area of the first and second parallax barriers 4 and 5, and is substantially equivalent to a 50%, which is by far larger than a conventional 5% (as a 10% times area ratio), permitting a remarkably bright vision to be observed.

In the first embodiment, in place of the first parallax barrier 4, the second parallax barrier 5 may be shifted by a shifter 6.

Or alternately, the first and second parallax barriers 4 and 5 may have their shifters 6 operable in opposite directions to each other to provide between the barriers 4 and 5 a relative displacement apparently equivalent to a shift in the first embodiment.

Moreover, in place of the displacement by the shifter 6, either parallax barrier may be sequentially deformingly shifted in accordance with a scan timing for writing a right eye or left eye image, as it is changed from a left eye or right eye image, respectively, to reduce a crosstalk therebetween.

For example, in an initial phase of an image write action, the first parallax barrier 4 may be inclined to have an upper part thereof go ahead in a shift direction, and upon completion of the write action, a lower part of the barrier 4 may be shifted to the end, restoring stripe regions thereof into their vertical positions.

Further, the parallax barrier to be shifted may be divided into a plurality of sections sequentially shiftable in synchronism with an image write action.

Figure 4A:
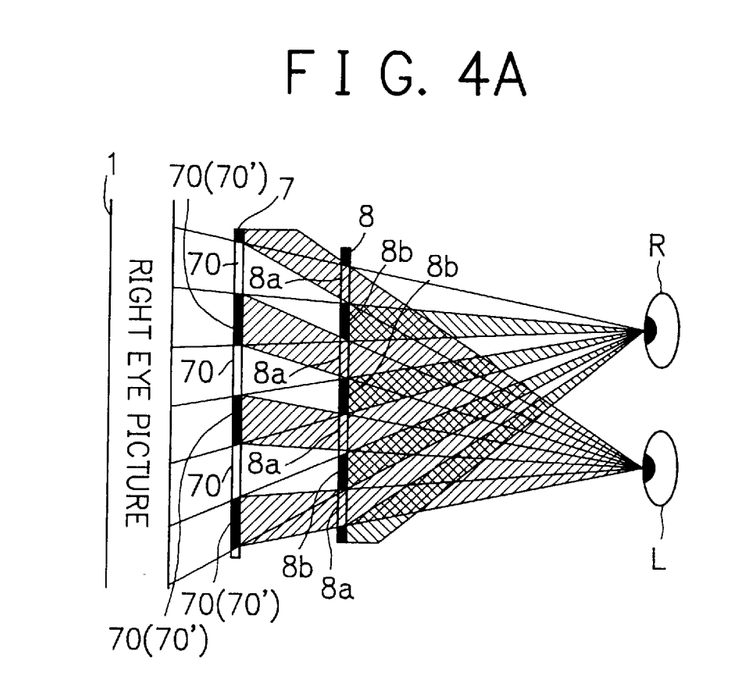
FIGS. 4A and 4B are sectional plans at controlled timings to see right eye and left eye pictures of a stereoscopic display system according to another embodiment of the invention, respectively.
Figure 4B:
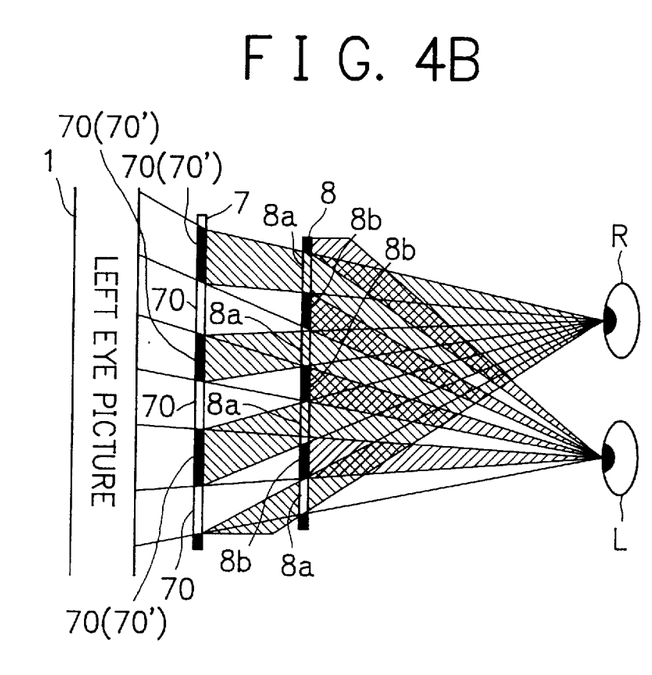

FIGS. 4A and 4B show sectional plans at controlled periods to see right eye and left eye pictures of a stereoscopic display system according to a second embodiment of the invention, respectively.

This stereoscopic display system comprises a display 1, and a combination of an electronic shutter array 7 and a parallax barrier 8 disposed in front of the display 1 in a mutually opposing manner.

There will be described below principal actions of the stereoscopic display system according to the second embodiment.

The display 1 has a right eye picture and a left eye picture alternatively displayed thereon every field.

As shown in FIG. 4A with the right eye picture displayed on the display 1, the electronic shutter array 7 comprises a plurality of optical shutters 70 formed at a predetermined pitch with a configuration of a vertical extending stripe. Each shutter 70 is controllable with an input signal thereto to be on for transmitting light and to be off for shutting off the transmission of light to shade an observer's eye from an associated right eye or left eye image.

In the electronic shutter array 7, every other optical shutter 70 is turned on or off with the remaining shutters 70 turned off or on, respectively, so that transparent stripe regions appear at a predetermined pitch or at intervals of a stripe width.

The parallax barrier 8 also has light transparent regions 8a and (eye) shading regions 8b (from the picture) vertically extending like stripes.

Like the first embodiment, associated dimensions are geometrically designed in accordance with observers' eye positions, such as of a distance between the electronic shutter array 7 and the parallax barrier 8 as well as pitches of optical shutters 70 as transparent or shading regions of the shutter array 7 and those of transparent and shading regions 8a and 8b of the barrier 8.

As a result, in FIG. 4A, the right eye picture on the display 1 can be seen from the right eye R of each observer through the transparent regions 70 and 8a, but the left eye L is shaded therefrom by the shading regions 70 (hereafter sometimes designated by "70'") and 8b.

In FIG. 4B with the left eye picture displayed on the display 1, the electronic shutter array 7 have control signals thereto inverted from their states in FIG. 4A, so that the respective transparent regions 70 of FIG. 4A become shading and the respective shading regions 70' of FIG. 4A become transparent, i.e. they are reversed.

As a result, in FIG. 4B, the left eye picture on the display 1 can be seen from the left eye L of each observer through the transparent regions 70 and 8a, but the right eye R is shaded therefrom by the shading regions 70' and 8b.

As the right eye picture and the left eye picture are cooperative with each other to constitute a pair of complementary parallax images for both eyes, each observer whose right eye R and left eye L independently observe the right eye and left eye pictures, respectively, is permitted to see them forming a stereoscopic vision.

There will be detailed below the arrangement of the stereoscopic display system of the second embodiment.

The display 1 and the parallax barrier 8 of the second embodiment are analogous to the display 1 and the parallax barrier 5 of the first embodiment, respectively.

In the electronic shutter array 7, each optical shutter 70 comprises: a pair of stripe-shaped transparent electrodes formed either on both of a pair of glass substrates, each subjected over the surface area to a rubbing process to have an LC (liquid crystal) orienting tendency, and sticked to be assembled together with distance pieces securing a gap therebetween; a volume of LC filled in the gap and sealed along the periphery; and a pair of polarizers sticked on the front and rear sides, respectively. The LC is ferroelectric and has a response speed of 1 msec or less.

The optical shutters 70 have a width of approx. 0.2006 mm, and are arrayed to form the transparent or shading regions at a pitch of approx 0.4012 mm. The shutter array 7 and the parallax barrier 8 are disposed to oppose each other at an optical distance of approx. 1.8519 mm, with their stripe regions parallel to each other.

A vertical synchronizing signal is detected from a video signal input to the display 1, so that its timing may be employed to drive the optical shutters 70 as LC members.

For example, the shutters 70 may be controlled to be changed over between an arrangement of transparent and shading regions in FIG. 4A at an odd-number field in which the right eye picture is displayed, and a reverse arrangement of transparent and shading regions in FIG. 4B at an even-number field in which the left eye picture is displayed.

The stereoscopic display system according to the second embodiment simply employs a pair of polarizers at an optical shutter 70, permitting a stereoscopic vision to be substantially twice as bright as the conventional example of FIGS. 2A and 2B.

The electronic shutter array 7 and the parallax barrier 8 may be assembled together as a unit so that upon change-over between a stereoscopic vision and a two-dimensional picture the unit may be simply attached to or detached from the display 1 with ease, without needing an accurate positioning.

In the second embodiment, the shutter array 7 and the parallax barrier 8 may be disposed at the observer side and at the side of the display 1, respectively, to achieve similar effects. In this case, the shutter array 7 and the parallax barrier 8 may preferably have their transparent and shading regions at appropriate pitches re-designed in consideration of their geometrical positions.

Moreover, in the second embodiment in which each optical shutter 70 is on-off controlled as a single stripe member, such the stripe region may preferably be divided into a vertical array of sub-regions so that they may be sequentially on-off controlled in accordance with a scan timing for writing a right eye or left eye image, as it is changed from a left eye or right eye image, respectively, to reduce a crosstalk therebetween.

Figure 5A:
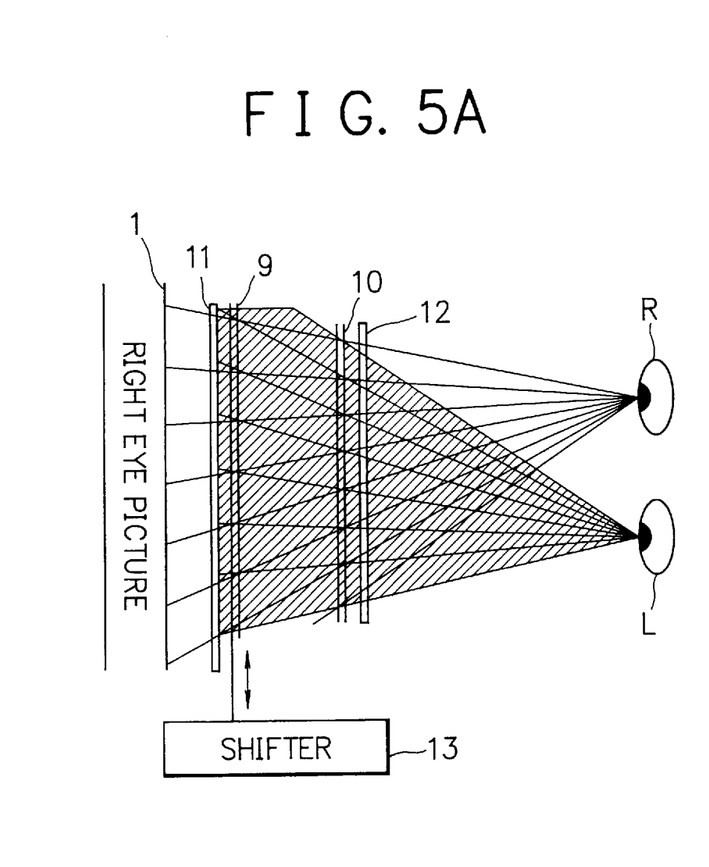
FIGS. 5A and 5B are sectional plans at controlled timings to see right eye and left eye pictures of a stereoscopic display system according to another embodiment of the invention, respectively.
Figure 5B:
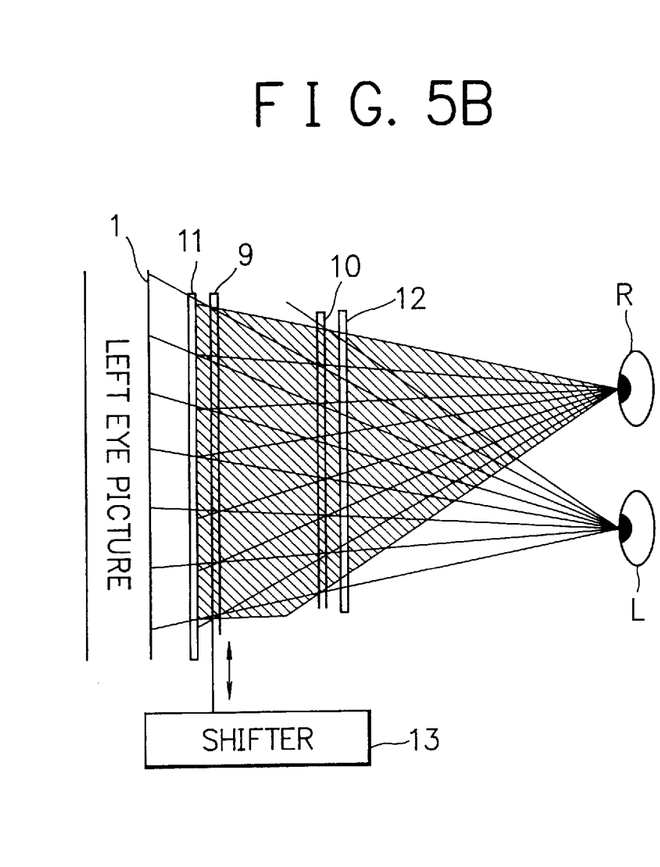
Figure 6A:
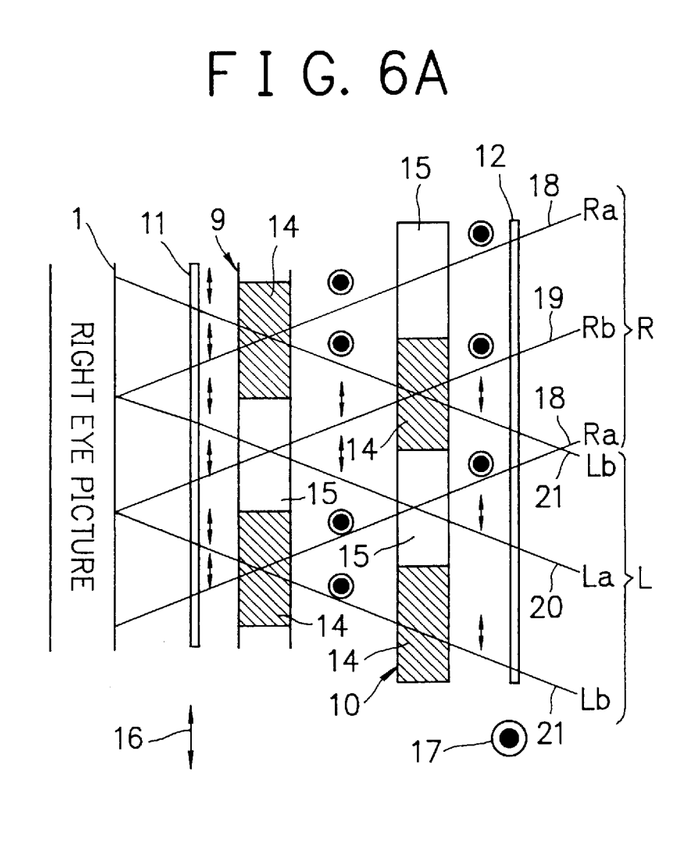
FIGS. 6A and 6B are partially enlarged views of FIGS. 5A and 5B, respectively.
Figure 6B:
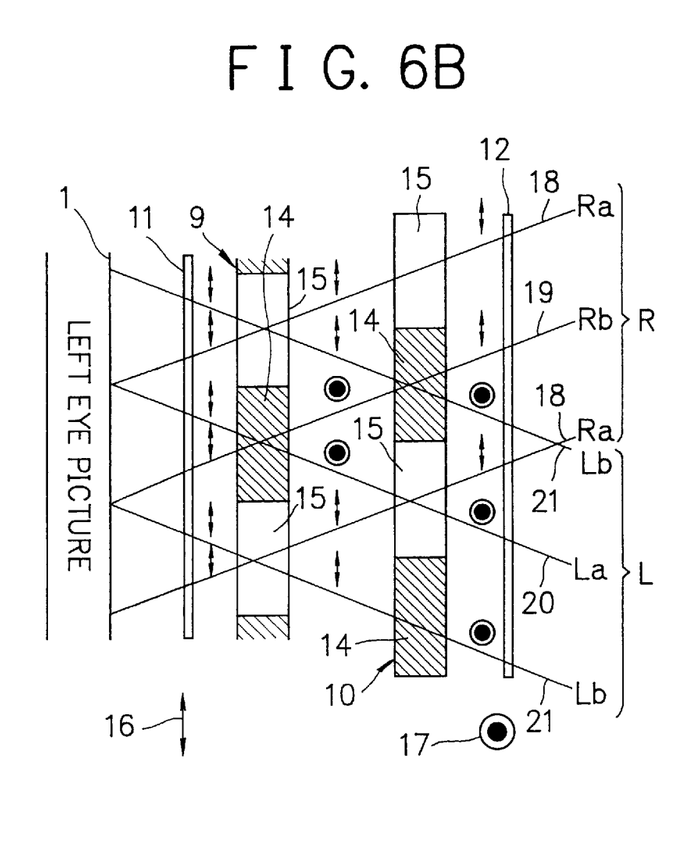

FIGS. 5A and 5B show sectional plans at controlled timings to see right eye and left eye pictures of a stereoscopic display system according to a third embodiment of the invention, respectively. FIGS. 6A and 6B are partially enlarged views of FIGS. 5A and 5B, respectively.

This stereoscopic display system comprises a display 1, a pair of polarizers 11 and 12 disposed in front of the display 1 in a mutually opposing manner, a combination of a first rotary-polarizing multi-slit member 9 and a second rotary-polarizing multi-slit member 10 disposed between the polarizers 11 and 12 in a mutually opposing manner, and a shifter 13 as a shifting mechanism linked with the first rotary-polarizing multi-slit member 9.

There will be described below principal actions of the stereoscopic display system according to the third embodiment.

The display 1 has a right eye picture and a left eye picture alternatively displayed thereon every field.

As shown in FIGS. 5A and 6A with the right eye picture displayed on the display 1, the first rotary-polarizing multi-slit member 9 as well as the second rotary-polarizing multi-slit member 10 comprises a plurality of stripe-shaped regions 14 (hatched in FIG. 6A) each for rotating at a 90° a polarization direction of linear polarized incident light thereto and a plurality of stripe-shaped regions 15 (blank in FIG. 6A) each for keeping the polarization direction of linear polarized incident light thereto, as it is.

Like the first embodiment, associated dimensions are geometrically designed in accordance with observers' eye positions, such as of a distance between the first and second multi-slit members 9 and 10 as well as pitches of the stripe-shaped regions therein.

As a result, when looking the right eye picture, it is conditioned for a right eye R of an observer to traverse one of a combination of a polarization direction nonrotatable stripe region 15 of the second multi-slit member 10 and a polarization direction 90° rotatable stripe region 14 of the first multi-slit member 9 for a view point Ra and a combination of a 90° rotatable stripe region 14 of the second multi-slit member 10 and a 90° rotatable stripe region 14 of the first multi-slit member 9 for a view point Rb, and for a left eye L of the observer to traverse one of a combination of a non-rotatable region 15 of the second multi-slit member 10 and a non-rotatable region 15 of the first multi-slit member 9 for a view point La and a combination of a rotatable region 14 of the second multi-slit member 10 and a rotatable region 14 of the first multi-slit member 9 for a view point Lb.

The polarizer 11 has a polarization direction 16 thereof set to transmit linear polized light with a plarization direction parallel to a paper face of the drawing sheet.

The polarizer 12 has a polarization direction 17 thereof set to transmit linear polized light with a plarization direction normal to the paper face.

Rays of radiated light from the display 1 at a direction 18 toward the view point Ra of the right eye R are transmitted through the polarizer 11 where they are linear polarized in parallel to the paper face, then through the 90° rotatable region 14 of the first multi-slit member 9 where their polarization direction is rotated at a 90° to be normal to the paper face, then through the non-rotatable region 15 of the second multi-slit member 10 where the polarization direction is unchanged and hence kept normal to the paper sheet, and through the polarizer 12 of which the polarization direction also is normal to the paper sheet, to the right eye R which is thus permitted to see the right eye picture.

Rays of radiated light from the display 1 at a direction 19 toward the view point Rb of the right eye R are transmitted through the polarizer 11 where they are linear polarized in parallel to the paper face, then through the non-rotatable region 15 of the first multi-slit member 9 where their polarization direction is unchanged and hence kept parallel to the paper sheet, then through the 90° rotatable region 14 of the second multi-slit member 10 where the polarization direction is rotated at a 90° to be normal to the paper face, and through the polarizer 12 of which the polarization direction also is normal to the paper sheet, to the right eye R which is thus permitted to see the right eye picture.

Rays of incident light from the display 1 to the right eye R consist of those transmitted along the direction 18 with described polarization effects and those transmitted along the direction 19 with described polarization effects. As a result, in FIG. 5A, an entirety of the right eye picture on the display 1 can be seen by the right eye R of each observer.

On the other hand, rays of radiated light from the display 1 at a direction 20 toward the view point La of the left eye L are transmitted through the polarizer 11 where they are linear polarized in parallel to the paper face, then through the non-rotatable region 15 of the first multi-slit member 9 where their polarization direction is unchanged and hence kept parallel to the paper sheet, and through the non-rotatable region 15 of the second multi-slit member 10 where the polarization direction is unchanged and still kept parallel to the paper sheet, to the polarizer 12 of which the polarization direction is normal to the paper sheet and hence at which the incident light is shut. Accordingly, the left eye L is unable to see the right eye picture from the view point La.

Further, rays of radiated light from the display 1 at a direction 21 toward the view point Lb of the left eye L are transmitted through the polarizer 11 where they are linear polarized in parallel to the paper face, then through the 90° rotatable region 14 of the first multi-slit member 9 where their polarization direction is rotated at a 90° to be normal to the paper face, and through the 90° rotatable region 14 of the second multi-slit member 10 where the polarization direction is further rotated at a 90° to be parallel to the paper face, to the polarizer 12 of which the polarization direction is normal to the paper sheet and hence at which the incident light is shut. Accordingly, the left eye L is unable to see the right eye picture from the view point Lb also.

Rays of light transmittable from the display 1 toward the left eye L consist of those transmitted along the direction 20 with described polarization effects and those transmitted along the direction 21 with described polarization effects. As a result, in FIG. 5A, the right eye picture on the display 1 cannot be seen by the left eye L of each observer.

In FIGS. 5B and 6B with the left eye picture displayed on the display 1, the first multi-slit member 9 is displaced by the shifter 13 in a horizontal direction to have the 90° rotatable regions 14 thereof in spatial regions corresponding to the non-rotatable regions 15 in FIG. 6A and the non-rotatable regions 15 thereof in spatial regions corresponding to the 90° rotatable regions 14 in FIG. 6A so that the former spatial regions are reversed from a non-rotatable state to a 90° rotatable state and the latter spatial regions are reversed from a 90° rotatable state to a non-rotatable state, while the second multi-slit member 10 is kept in position of FIG. 5A.

In FIG. 6B, rays of radiated light from the display 1 at the direction 18 toward the view point Ra of the right eye R are transmitted through the polarizer 11 where they are linear polarized in parallel to the paper face, then through the non-rotatable region 15 of the first multi-slit member 9 where their polarization direction is unchanged and hence kept parallel to the paper sheet, and through the non-rotatable region 15 of the second multi-slit member 10 where the polarization direction is unchanged and still kept parallel to the paper sheet, to the polarizer 12 of which the polarization direction is normal to the paper sheet and hence at which the incident light is shut. Accordingly, the right eye R is unable to see the left eye picture from the view point Ra.

Rays of radiated light from the display 1 at the direction 19 toward the view point Rb of the right eye R are transmitted through the polarizer 11 where they are linear polarized in parallel to the paper face, then through the 90° rotatable region 14 of the first multi-slit member 9 where their polarization direction is rotated at a 90° to be normal to the paper face, and through the 90° rotatable region 14 of the second multi-slit member 10 where the polarization direction is further rotated at a 90° to be parallel to the paper face, to the polarizer 12 of which the polarization direction is normal to the paper sheet and hence at which the incident light is shut. Accordingly, the right eye R is unable to see the left eye picture from the view point Rb also.

Rays of light transmittable from the display 1 toward the right eye R consist of those transmitted along the direction 18 with described polarization effects and those transmitted along the direction 19 with described polarization effects. As a result, in FIG. 5B, the left eye picture on the display 1 cannot be seen by the right eye R of each observer.

On the other hand, rays of radiated light from the display 1 at the direction 20 toward the view point La of the left eye L are transmitted through the polarizer 11 where they are linear polarized in parallel to the paper face, then through the 90° rotatable region 14 of the first multi-slit member 9 where their polarization direction is rotated at a 90° to be normal to the paper face, then through the non-rotatable region 15 of the second multi-slit member 10 where the polarization direction is unchanged and hence kept normal to the paper sheet, and through the polarizer 12 of which the polarization direction also is normal to the paper sheet, to the left eye L which is thus permitted to see the left eye picture.

Further, rays of radiated light from the display 1 at the direction 21 toward the view point Lb of the left eye L are transmitted through the polarizer 11 where they are linear polarized in parallel to the paper face, then through the non-rotatable region 15 of the first multi-slit member 9 where their polarization direction is unchanged and hence kept parallel to the paper sheet, then through the 90° rotatable region 14 of the second multi-slit member 10 where the polarization direction is rotated at a 90° to be normal to the paper face, and through the polarizer 12 of which the polarization direction also is normal to the paper sheet, to the left eye L which is thus permitted to see the left eye picture.

Rays of incident light from the display 1 to the left eye L consist of those transmitted along the direction 20 with described polarization effects and those transmitted along the direction 21 with described polarization effects. As a result, in FIG. 5B, an entirety of the left eye picture on the display 1 can be seen by the left eye L of each observer.

As the right eye picture and the left eye picture are cooperative with each other to constitute a pair of complementary parallax images for both eyes, each observer whose right eye R and left eye L independently observe the right eye and left eye pictures, respectively, is permitted to see them forming a stereoscopic vision.

There will be detailed below the arrangement of the stereoscopic display system described.

The display 1 of the third embodiment is analogous to the display 1 of the first embodiment.

The polarizer 11 as well as the polarizer 12 comprises a polarization layer composed of a polyvinyl alcohol film with an oriented absorbed coat such as of iodine, and tri-acetate films adhering to both sides of the polarization layer for a protection purpose.

The polarizers 11 and 12 are separated from the first and second multi-slit members 9 and 10 in the figures, respectively, but may preferably be sticked thereto.

In the first and second rotary-polarizing multi-slit members 1 and 10, each stripe region 14 or 15 comprises: a pair of stripe-shaped transparent electrodes formed either on both of a pair of glass substrates, each subjected over the surface area to a rubbing process to have an adequate LC orienting tendency, and sticked to be assembled together with distance pieces securing a gap therebetween; and a volume of LC filled in the gap and sealed along the periphery.

The LC is a twisted nematic type which is adapted, in a normal state free of a significant voltage imposed thereon, to have a tendency to rotate a polarization direction of linear polarized incident light at a 90° and, in an excited state with a sufficient voltage imposed thereon, to cancel the tendency, thus entering a non-rotatable state.

In this respect, in FIGS. 6A and 6B, an unshown drive circuit is controllable to turn off a drive voltage to each 90° rotatable region 14 and turn on a drive voltage to each non-rotatable region 15.

The 90° rotatable regions 14 and the non-rotatable regions 15 in the first multi-slit member 9 have a width of approx. 0.2006 mm, and those in the second multi-slit member 10 have a width of approx. 0.2 mm. The first and second multi-slit members 9 and 10 are disposed to oppose each other at an optical distance of approx. 1.8519 mm, with their stripe regions parallel to each other.

The shifter 13, which may be a piezoelectric actuator or the like, is implemented to shift the first multi-slit member 9 by the width of the stripe regions 14 thereof. For this purpose, a vertical synchronizing signal is detected from a video signal input to the display 1, so that its timing may be employed to drive the piezoelectric actuator or the like.

For example, the first multi-split member 9 may be shifted in position as in FIGS. 5A and 6A at an odd-number field in which the right eye picture is displayed, and as in FIGS. 5B and 6B at an even-number field in which the left eye picture is displayed.

The stereoscopic display system according to the third embodiment, which has no shading structure at every other line like the parallax barrier of the first and second embodiments, permits a stereoscopic vision to be achieved with a 37% brightness due to a pair of polarizers and the like, which brightness is over thrice as large as the conventional example of FIGS. 2A and 2B taking into account various losses such as by the LC.

Moreover, absent of a shading at every other line like a parallax barrier, the third embodiment is prevented from having a picture resolution reduced to a half, thus permitting a high-precision stereoscopic vision to be observed.

The first and second multi-slit members 9 and 10 and the shifter 13 may be assembled together as a unit so that upon change-over between a stereoscopic vision and a two-dimensional picture the unit may be simply attached to or detached from the display 1 with ease, i.e, without needing a precise positioning.

In the third embodiment, in place of the first multi-slit member 9, the second multi-slit member 10 may be shifted by a shifter 13.

Or alternately, the first and second multi-slit members 9 and 10 may have their shifters 13 operable in opposite directions to each other to provide between the members 9 and 10 a relative displacement apparently equivalent to a shift in the third embodiment.

Further, in place of the displacement by the shifter 13, either multi-slit member 9 or 10 may be sequentially deformingly shifted in accordance with a scan timing for writing a right eye or left eye image, as it is changed from a left eye or right eye image, respectively, to reduce a crosstalk therebetween.

For example, in an initial phase of an image write action, the first multi-slit member 9 may be inclined to have an upper part thereof go ahead in a shift direction, and upon completion of the write action, a lower part of the member 9 may be shifted to the end, restoring stripe regions thereof into their vertical positions.

Further, each stripe region of the multi-slit member to be shifted may be divided into a vertical array of sub-regions sequentially shiftable in synchronism with an image write action.

Figure 7A:
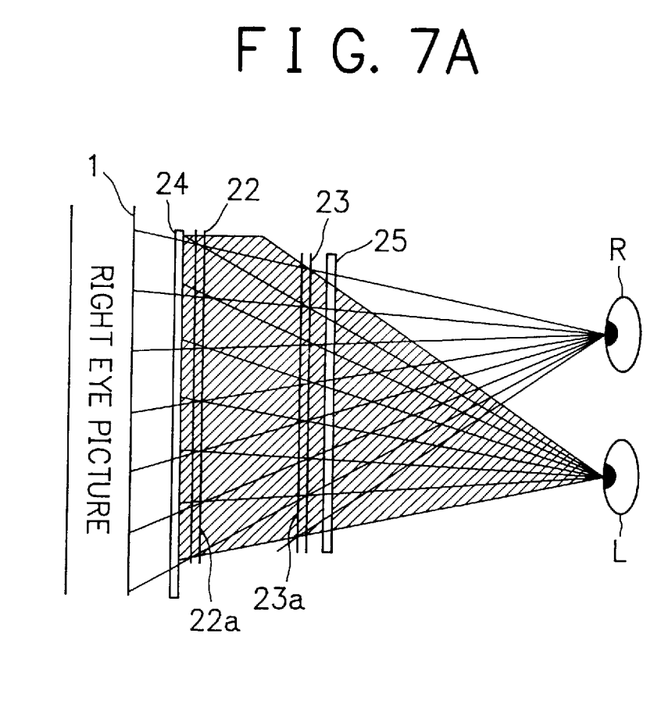
FIGS. 7A and 7B are sectional plans at controlled timings to see right eye and left eye pictures of a stereoscopic display system according to another embodiment of the invention, respectively.
Figure 7B:
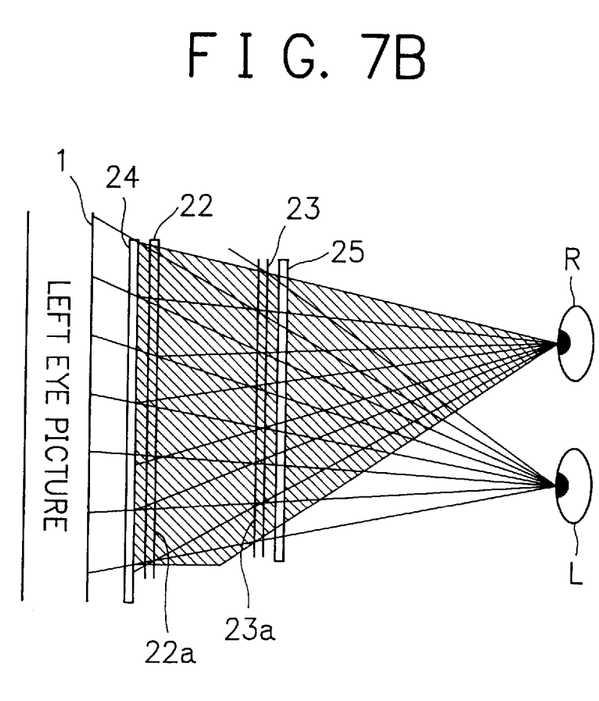

FIGS. 7A and 7B show sectional plans at controlled timings to see right eye and left eye pictures of a stereoscopic display system according to a fourth embodiment of the invention, respectively.

This stereoscopic display system comprises a display 1, a pair of polarizers 24 and 25 disposed in front of the display 1 in a mutually opposing manner, and a combination of a rotary-polarizing switch array 22 and a rotary-polarizing multi-slit member 23 disposed between the polarizers 24 and 25 in a mutually opposing manner.

The display 1 of the fourth embodiment is analogous to the display 1 of the first embodiment.

The polarizers 24 and 25 of the fourth embodiment are analogous to the polarizers 11 and 12 of the third embodiment.

The switch array 22 as well as the multi-slit member 23 comprises a horizontal array of vertically extending stripe regions 22a or 23a. Each stripe region 22a or 23a comprises: a pair of stripe-shaped transparent electrodes formed either on both of a pair of glass substrates, each subjected over the surface area to a rubbing process to have an adequate LC orienting tendency, and sticked to be assembled together with distance pieces securing a gap therebetween; and a volume of LC filled in the gap and sealed along the periphery.

The LC is a ferroelectric type, which is adapted for a control in response to a voltage imposed thereon to have a tendency to rotate a polarization direction of linear polarized incident light at a 90° and to cancel the tendency, entering a non-rotatable state.

Dimensions and controlled arrangement of the stripe regions 22a with and without the 90° rotatable tendency are similar to those of the 90° rotatable regions 14 and the non-rotatable regions 15 of the first multi-slit member 9, respectively.

Dimensions and controlled arrangement of the stripe regions 23a with and without the 90° rotatable tendency are similar to those of the 90° rotatable regions 14 and the non-rotatable regions 15 of the second multi-slit member 10, respectively.

The stereoscopic display system according to the fourth embodiment has similar actions to the third embodiment described in conjunction with FIGS. 5A, 5B, 6A and 6B.

In other words, by controlling polarization directions of rays of light towards a right eye R and a left eye L of each observer, it is permitted for the right eye R only to see a right eye picture, as it is displayed on the display 1, and for the left eye L only to see a left eye picture, as it is displayed on the display 1.

As the right eye picture and the left eye picture are cooperative with each other to constitute a pair of complementary parallax images for both eyes, each observer whose right eye R and left eye L independently observe the right eye and left eye pictures, respectively, is permitted to see them forming a stereoscopic vision.

In this respect, in the third embodiment, the 90° rotatable state and the non-rotatable state at each spatial region corresponding to a stripe region of the first multi-slit member 9 is switched over therebetween by a mechanical shift action of the shifter 13.

In the fourth embodiment, however, such a switching is electronically effected. For this purpose, a vertical synchronizing signal is detected from a video signal input to the display 1, so that its timing may be employed to drive each stripe region as an LC member.

For example, each stripe region 22a of the switch array 22 is controlled to be switched over between a 90° rotatable state and a non-rotatable state thereof in accordance with a timing by which the right eye picture or the left eye picture is displayed on the display 1.

The fourth embodiment thus permits a high-precision stereoscopic vision to be observed with a high brightness, like the third embodiment.

In the fourth embodiment, the switch array 22 and the multi-slit member 23 may be disposed at the observer side and at the side of the display 1, respectively, to achieve similar effects. In this case, the switch array 22 and the multi-slit member 23 may preferably have their polarization controlling stripe regions 22a and 23a at appropriate pitches re-designed in consideration of their geometrical positions.

Moreover, in the fourth stripe embodiment in which each stripe region 22a of the switch array 22 is on-off controlled as a single stripe member, such the stripe region may preferably be divided into a vertical array of sub-regions so that they may be sequentially on-off controlled in accordance with a scan timing for writing a right eye or left eye image, as it is changed from a left eye or right eye image, respectively, to reduce a crosstalk therebetween.

The foregoing embodiments may be modified in various manners.

For example, the display 1 may not always be a CRT. It may be an LC display or plasma display high of a response speed, or a display using an LED (light emitting diode) or a scanning laser beam.

Moreover, the display 1 is not limited to a direct observation type. It may be a projection type.

Further, there may be employed an electro-optical elements such as a PLZT, i.e. $PbLa(ZrTi)O_3$, as the LC in the electronic shutter array 7, the first and/or second rotary-polarization multi-slit member 9 and/or 10, the rotary-polarization switch array 22 and/or the rotary-polarization multi-slit member 23.

In the third or fourth embodiment, the polarizers 11 and 12 or 24 and 25 may have another combination of polarization directions than the polarization directions 16 and 17.

The polarization directions may be parallel to each other. In this case, 90° rotatable regions and non-rotatable regions may be re-combined, accordingly.

The polarization directions may not be parallel or perpendicular to a vertical direction of the display 1. They may be otherwise set, e.g. to a 45° direction. In this case, the first multi-slit member 9 may have a re-oriented optical axis, accordingly.

The shifter 6 or 13 may comprise a combination of an electric motor and a cam mechanism, or may be an implementation using an electromagnetic effect.

The foregoing embodiments may suffer a moire stripe pattern due to an interference between a pitch of pixels of the display 1 and a pitch of the transparent and/or shading regions of the first parallax barrier 4, the electronic shutter array 7 or the like.

Such the moire pattern may preferably be eliminated by adjusting a distance between the display 1 and the first parallax barrier 4, the electronic shutter array 7 or the like.

In the foregoing embodiments, respective associated components may preferably have their reflectivities of light possibly reduced to improve an image quality of a stereoscopic vision.

As will be seen from the foregoing description, according to the present invention, a stereoscopic display system simply employs at most two polarizers, permitting a changeover between a stereoscopic vision and a two-dimensional picture to be achieved with ease, with an increased brightness.

Moreover, a rotary-polarization multi-slit member or a rotary-polarization switch array is employed to eliminate stripe-shaped shading regions, permitting a picture to be observed by a right or left eye with a still increased brightness, as well as a high-precision stereoscopic vision to be achieved without reducing a vision resolution to a half.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A stereoscopic display system comprising:
   a display for temporarily alternatively displaying a right eye picture and a left eye picture cooperative with each other to provide binocular parallax information;
   a first parallax barrier and a second parallax barrier arranged both in front of the display and disposed either behind the other, the first and second parallax barriers each having a plurality of transparent regions and a plurality of shading regions alternatively formed therein so as to extend like stripes elongate in a parallel direction to a vertical direction of the right eye and left eye pictures; and
   a shifter for shifting one of the first and second parallax barriers in one of rightward and leftward directions of the right eye and left eye pictures in synchronism with a display switching between the right eye and left eye pictures so that the right eye picture is observable by a right eye of an observer and the left eye picture is observable by a left eye of the observer.

2. A stereoscopic display system according to claim 1, wherein:
   the display has a plurality of horizontal scan lines sequentially operable from a top one in a display action for sequentially displaying one of the right eye picture and the left eye picture, as it is switched from the other thereof; and
   said one of the first and second parallax barriers is stepwise shifted sequentially from a top portion thereof in synchronism with the display action.

3. A stereoscopic display system comprising:
   a display for temporarily alternatively displaying a right eye picture and a left eye picture cooperative with each other to provide binocular parallax information;
   a pair of polarizers arranged in front of the display and disposed either behind the other;
   a first rotary-polarizing multi-slit member and a second rotary-polarizing multi-slit member arranged both between the pair of polarizers and disposed either behind the other, the first and second rotary-polarizing multi-slit members being each composed of a plurality of first regions each having a tendency to rotate a polarization direction of incident light thereto substantially at a 90° direction and a plurality of second regions each having a tendency to hold a polarization direction of incident light thereto, the first and second regions being alternatively formed so as to extend like stripes elongate in a parallel direction to a vertical direction of the right eye and left eye pictures; and
   a shifter for shifting one of the first and second rotary-polarizing multi-slit members in one of rightward and leftward directions of the right eye and left eye pictures in synchronism with a display switching between the right eye and left eye pictures so that the right eye picture is observable by a right eye of an observer and the left eye picture is observable by a left eye of the observer.

4. A stereoscopic display system according to claim 3, wherein:
   the display has a plurality of horizontal scan lines sequentially operable from a top one in a display action for sequentially displaying one of the right eye picture and the left eye picture, as it is switched from the other thereof, and
   said one of the first and second rotary-polarizing multi-slit members is stepwise shifted sequentially from a top portion thereof in synchronism with the display action.

5. A stereoscopic display system comprising:
   a display for temporarily alternatively displaying a right eye picture and a left eye picture cooperative with each other to provide binocular parallax information;
   a pair of polarizers arranged in front of the display and disposed either behind the other;
   a rotary-polarizing multi-slit member arranged between the pair of polarizers and disposed in one of a first place and a second place therebetween either nearer to the display and the other nearer to an observer, the rotary-polarizing multi-slit member being composed of a plurality of first regions each having a tendency to rotate a polarization direction of incident light thereto substantially at a 90° direction and a plurality of second regions each having a tendency to hold a polarization direction of incident light thereto, the first and second regions being alternatively formed so as to extend like stripes elongate in a parallel direction to a vertical direction of the right eye and left eye pictures; and
   a rotary-polarizing switch array disposed in the other of the first place and the second place between the pair of polarizers, the rotary-polarizing switch array being composed of a plurality of third regions each having a tendency to rotate a polarization direction of incident light thereto substantially at a 90° direction and a plurality of fourth regions each having a tendency to hold a polarization direction of incident light thereto, the third and fourth regions being alternatively formed so as to extend like stripes elongate in the parallel direction to the vertical direction of the right eye and left eye pictures, the third regions and the fourth regions being reversible into a plurality of fifth regions each having a tendency to hold the polarization direction of the incident light thereto and a plurality of sixth regions each having a tendency to rotate the polarization direction of the incident light thereto substantially at a 90° direction, respectively, and vice versa, the rotary-polarizing switch array being operable for a switching between a first state having the third and fourth regions and a second state having the fifth and sixth regions in synchronism with a display switching between the right eye and left eye pictures so that the right eye picture is observable by a right eye of the observer and the left eye picture is observable by a left eye of the observer.

6. A stereoscopic display system according to claim 5, wherein:
   the display has a plurality of horizontal scan lines sequentially operable from a top one in a display action for sequentially displaying one of the right eye picture and the left eye picture, as it is switched from the other thereof, and the switching between the first state and the second state of the rotary-polarizing switch array is stepwise effected sequentially from a top portion of the rotary-polarizing switch array in synchronism with the display action.

* * * * *